Dec. 15, 1964     E. G. KIRCHNER     3,161,069

DEVICE FOR FINE ADJUSTMENT OF MACHINE PARTS

Filed Oct. 31, 1960     8 Sheets-Sheet 1

INVENTOR
Egon Kirchner

Dec. 15, 1964   E. G. KIRCHNER   3,161,069
DEVICE FOR FINE ADJUSTMENT OF MACHINE PARTS
Filed Oct. 31, 1960   8 Sheets-Sheet 2

INVENTOR:
Egon G. Kirchner
By
Walter Becker
Patent Agent

Dec. 15, 1964 E. G. KIRCHNER 3,161,069
DEVICE FOR FINE ADJUSTMENT OF MACHINE PARTS
Filed Oct. 31, 1960 8 Sheets-Sheet 3

INVENTOR
Egon G. Kirchner
By
Walter Becker
Patent Agent.

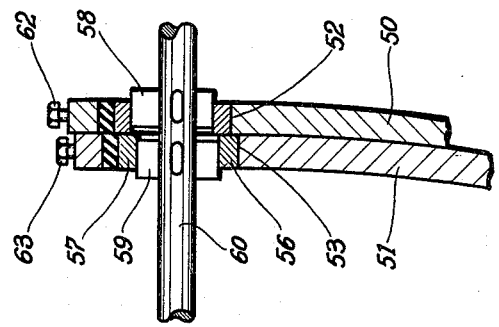
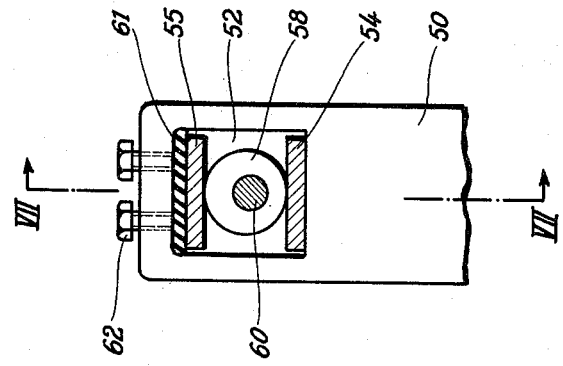

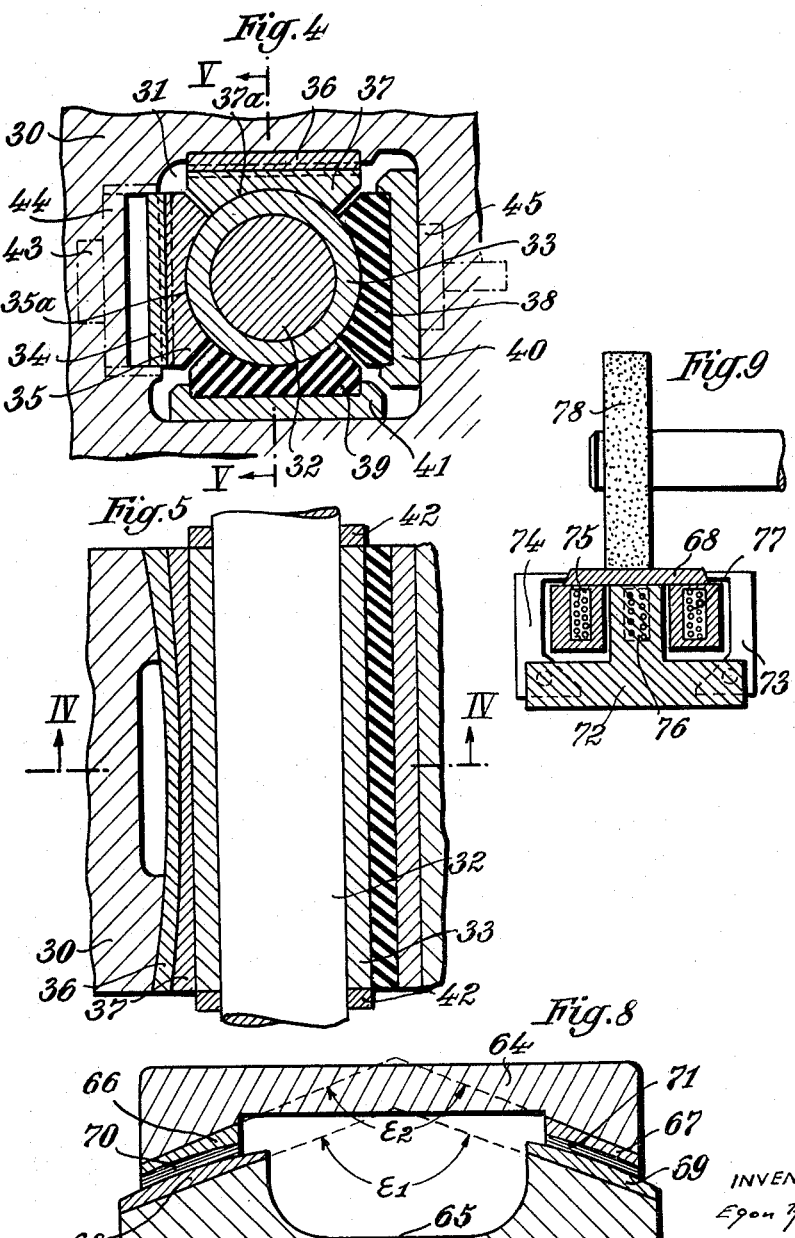

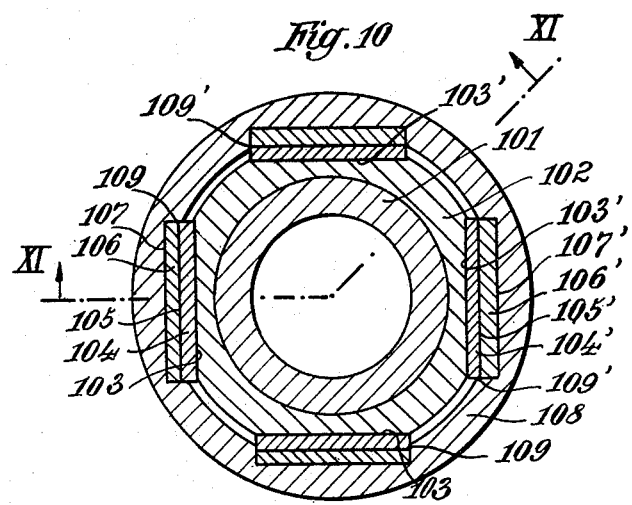
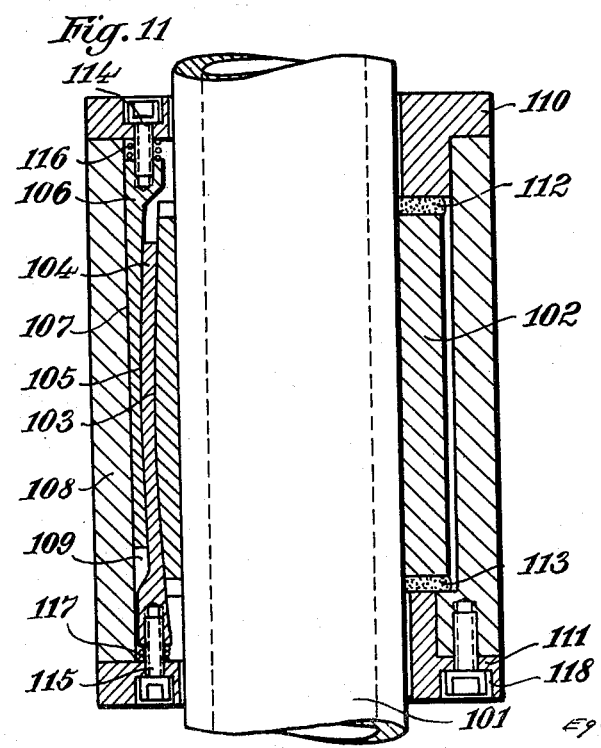

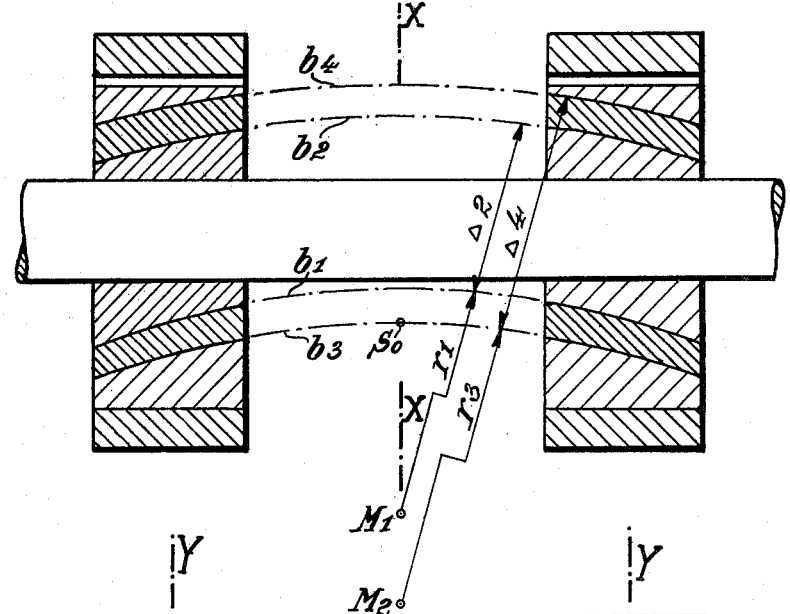
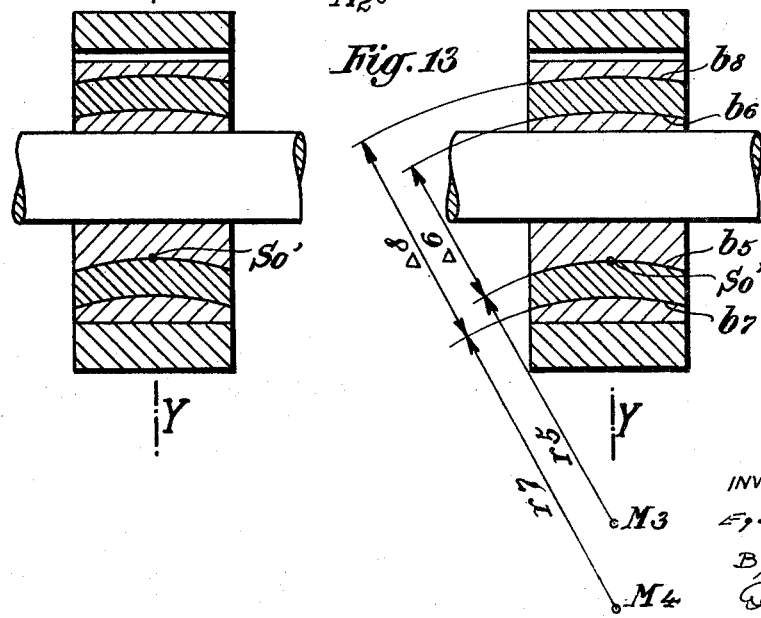

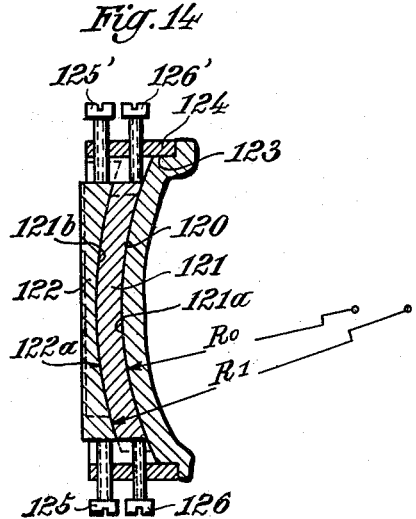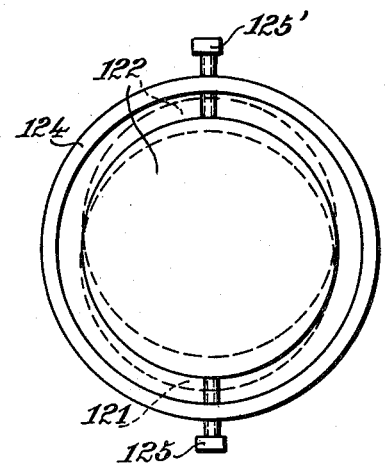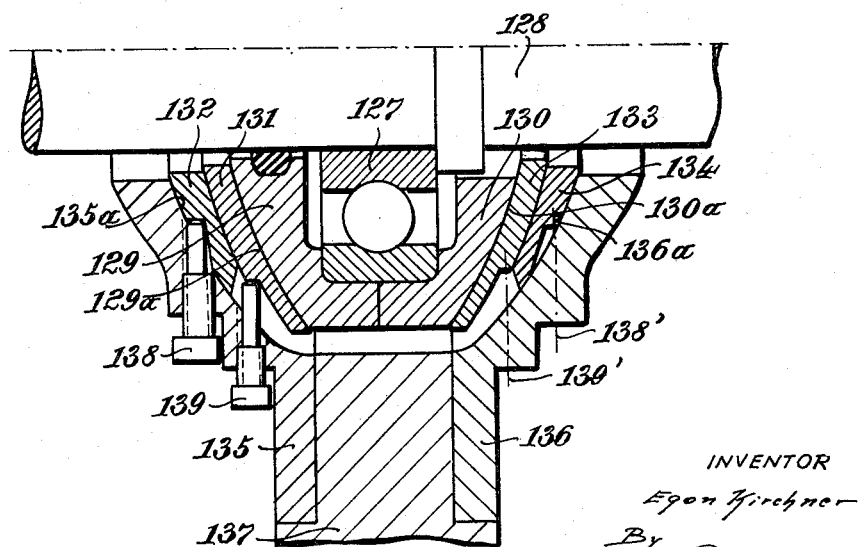

United States Patent Office 3,161,069
Patented Dec. 15, 1964

3,161,069
DEVICE FOR FINE ADJUSTMENT OF
MACHINE PARTS
Egon G. Kirchner, Klinkerberg 19, Augsburg, Germany
Filed Oct. 31, 1960, Ser. No. 66,315
Claims priority, application Germany Nov. 2, 1959
8 Claims. (Cl. 74—110)

The present invention relates to a device for effecting a fine adjustment of machine parts while employing curved guiding paths. The range of employment of the present invention generally comprises the journalling of spindles and shafts, especially in connection with chip-removing machine tools, in which the part to be adjusted or fed is guided on a guiding path along one of the three coordinates. Such machine tools comprise for instance lathes the tool of which is generally guided along two coordinates namely parallel and transverse to the axis of rotation. The machine tools involved also comprise milling machines, boring mechanisms and the like, in which the machining tool and/or the work table have to be adjustable also along the third (vertical) coordinate.

In all of these instances, the guiding of the carriage supporting the tool or the work table is effected by plane surfaces for instance dovetail-shaped depressions, prisms or the like so that such guiding path will permit displacements exclusively in one direction of a coordinate. If the adjusting operation requires displacements in the three coordinate directions, which actually, due to the spacial coordination of tool and work piece, applies to all machine tools including the lathe, three guiding paths are required for such movements, which guiding paths or guiding means when being produced require a considerable amount of precision work.

However, even with guiding means produced in conformity with modern high precision manufacturing processes, sources of errors are still unavoidable in view of the unavoidable bearing play, for instance of the guiding carriage of the working spindle, the adjusting mechanism, or if a spindle or shaft becomes un-round, which fact can be obviated at high costs only when employing customary means, because difficulties are encountered when effecting very minute adjustments.

The principle underlying the present invention consists in that when moving a point along a curved path, displacements occur along two coordinates while the displacement in one direction is extremely small with regard to the displacement in the other direction if the radius of curvature has been selected correspondingly large. Thus, employing this principle, very minute displacements may be effected.

On the basis of this finding, it is an object of the present invention to provide an arrangement which will allow feeding movements of the smallest magnitude by turning about large radii, if necessary also while fully maintaining the parallelity.

It is another object of this invention to provide means which will make it possible to move an eccentrically located axis of a spindle or shaft precisely into its center position.

A further object of this invention consists in the provision of means which will make it possible to move precisely into its axial direction a spindle or shaft which is only very slightly eccentrically located and is additionally at an angle to the central axis.

These and other objects and advantages of the present invention will appear more clearly from the following specification in connection with the accompanying drawings, in which:

FIG. 1 diagrammatically illustrates the principal of an embodiment of a guiding arrangement according to the invention for a table with one intermediate member.

FIG. 2 diagrammatically illustrates the principal of another embodiment of a guiding arrangement according to the invention for a table with two intermediate members.

FIG. 4 shows in section the journalling of a milling machine spindle adjustable and turnable in two planes perpendicular to each other, said section being taken along the line IV—IV of FIG. 5.

FIG. 5 represents a longitudinal section along the line V—V of FIG. 4 showing the journalling of the spindle of FIG. 4.

FIG. 6 is an adjusting mechanism for the intermediate members.

FIG. 7 is a section along the line VII—VII of FIG. 6.

FIG. 8 is a section through a machine table.

FIG. 9 illustrates a device for manufacturing slightly curved surfaces.

FIG. 10 is an adjusting device for a friction bearing with wedges having a circular cross section.

FIG. 11 is an axial section along the line XI—XI of FIG. 10.

FIG. 12 is a two-fold journalling system with dependent circular wedges.

FIG. 13 is a two-fold journalling system with independent circular wedges.

FIG. 14 illustrates in section an arrangement with spherically designed wedges.

FIG. 15 shows a top view of the arrangement of FIG. 14.

FIG. 16 shows an adjustable anti-friction bearing with two spherical wedge pairs.

General Arrangement

According to the present invention, the device for finely adjusting machine parts of machine tools is characterized in that for purposes of adjusting or feeding the work piece and/or the tool, one of these parts is, by means of an adjusting mechanism, displaceably mounted on a cylindrical guiding path transverse to the cylinder axis, while the cylinder radius is dimensioned correspondingly large for obtaining finest displacements. The guiding paths of the guided and of the guiding part have different centers of gravity, and at least one intermediate member is displaceably mounted between said parts and interconnects the differently curved guiding paths.

When employing the present invention to the journalling of a spindle, in conformity with the present invention, intermediate members with curved guiding surfaces are arranged in two planes perpendicular to each other.

The invention furthermore comprises an arrangement for finely adjusting a bearing bushing of shafts which is displaceable with regard to the supporting surface for such bushing, the bushing to be adjusted is adapted by changing its position to slide on curved sliding surfaces provided on wedge-shaped bodies adapted to be displaced along curved paths.

According to a further development of the invention, the generatrices of the sliding surfaces of the wedge-shaped bodies may be arcs, and particularly when sliding surfaces of the wedge-shaped bodies are involved. Portions of ball-shaped surfaces may be employed, i.e. spherical wedge-shaped bodies.

Structural Arrangement

Figure 1:
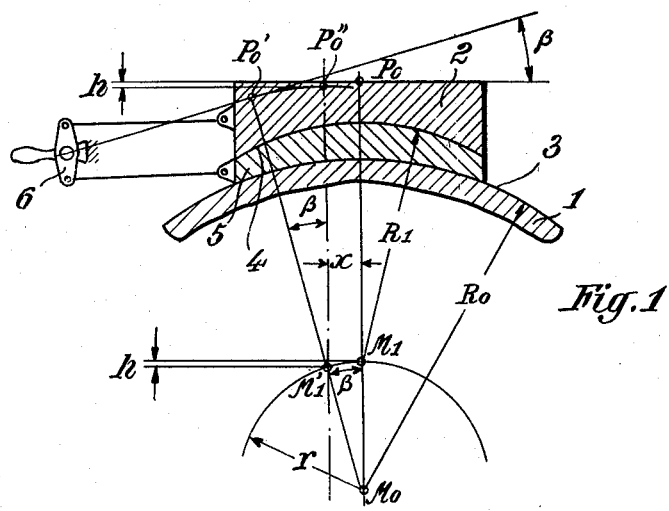

Referring now to the drawings in general and FIG. 1 thereof in detail, the arrangement shown therein comprises the guiding member 1 which may, for instance, be the guiding bed of a machine tool table, and the guided member 2, namely the table. As will be seen from the drawing, the guiding member 1 is provided with a curved guiding surface 3 of the radius $R_0$ and the center of curvature $M_0$. The guided member 2 is provided with the guiding surface 4 having a radius of curvature $R_1$ and the center $M_1$ spaced from the center of curvature $M_0$ by the distance $r$. Between table 2 and guiding member 1 there is arranged an intermediate member 5 which interconnects the guiding surfaces or guiding paths 3 and 4. $P_0$ is assumed to be a point on the engaging surface of table 2.

If table 2 together with the intermediate member 5 is turned about point $M_0$ by an angle $\beta$, point $P_0$ will move to point $P'_0$, whereas the center point $M_1$ will move to $M'_1$. In this way, the plane of the table will be inclined by the angle $\beta$. This inclination may be nullified by turning the table 2 alone, i.e. without the intermediate member 5, in opposite direction by the angle $\beta$ and about the center $M'_1$. Point $P'_0$ will then move into the position $P''_0$. If both movements are effected at one and the same time, for instance by means of the diagrammatically indicated adjusting mechanism 6, the line $M_1-P_0$ will on the arc with the radius $r$ be displaced in a translatory manner toward the left by the distance $x$. In this way, the points $M_1$ and $P_0$ will be lowered by the height $h$ of the circular segment with the sector angle $2\beta$ and the chord $2x$. From the geometric relationship there will be derived $$h = 2r \sin^2 \beta/2$$

It should be noted that this displacement in height is independent from the radii of curvature $R_0$ and $R_1$ of the guiding surfaces 3 and 4 which, therefore, also could be alike. By turning table 2 alone or together with the intermediate member 5, point $P_0$ may be displaced from its position $P''_0$ horizontally or also vertically so that an inclination of the table plane would be obtained.

The arrangement described in connection with FIG. 1 is primarily suited for work tables because in most instances a lateral displacement is permissible. However, with spindles such lateral displacement is sometimes undesirable. For the last mentioned instances of employment, therefore, the arrangement of FIG. 2 is provided which will allow a parallel displacement without lateral displacement.

Figure 2:
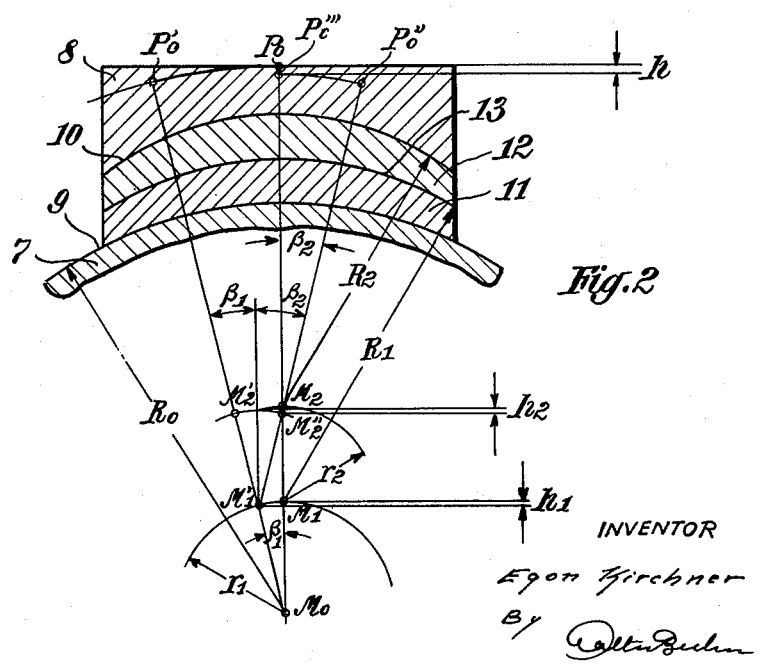

The arrangement according to FIG. 2 comprises a guiding bed 7 and a guided member 8 which may be represented by spindle box or a work table. The guiding bed 7 is provided with the guiding surface 9 having a radius of curvature $R_0$ and a center of curvature $M_0$. The guided member 8 has the guiding surface 10 with the radius of curvature $R_2$ about the center point $M_2$. Between the members 7 and 8 there are arranged two intermediate members 11, 12 which contact each other along a contacting surface 13 which is likewise curved and has the radius $R_1$ about the center point $M_1$. The center point $M_1$ is spaced from $M_0$ by a distance $r_1$, whereas the center point $M_2$ is spaced from $M_1$ by the distance $r_2$. For purposes of simplifying the arrangement, the distances $r_1$ and $r_2$ are selected as being of the same magnitude.

If now member 8 together with the intermediate members 11, 12 moves along the surface 9 about the center point $M_0$ by the angle $\beta_1$, the point $P_0$ located in the vertical central plane will move to $P'_0$, whereas the center point $M_2$ moves to $M'_2$, and the center point $M_1$ moves to $M'_1$. Now member 8 and the intermediate member 12, i.e. without intermediate member 11, are moved along the surface 13 about the center point $M'_1$ to such an extent that the center point $M'_2$ will again be located on the vertical straight line $P_0-M_0$. These two parts or members are thus turned back by the total angle of $\beta_1+\beta_2$ while the center point $M'_2$ moves to $M''_2$, and point P moves from $P'_0$ to $P''_0$. Inasmuch as in the particular example just discussed, $r_1=r_2$, also $\beta_1$ must be equal $\beta_2$. Finally member 8 is totally alone again moved toward the left along the surface 10, i.e. about the center point $M''_2$ about the angle $\beta_2=b_1$ while P moves from $P''_0$ to $P'''_0$ and thus will again be located on the vertical line $P_0-M_0$ but lowered by the distance $h=h_1+h_2$. In this last mentioned equation, $h_1$ is the height of the circular segment angle $2\beta_1$ and the radius $r_1$:

$$h_1 = 2r_1 \times \sin^2 \beta_1/2$$

$h_2$ is the height of the segmental section with the segment angle $2\beta_2$ and the radius $r_2$:

$$h_2 = 2r_2 \times \sin^2 \beta_2/2$$

Inasmuch at $r_1=r_2$, and since $\beta_1=\beta_2$, there will be obtained a lowering height of $$h = 4r_1 \times \sin^2 \beta_1/2$$

It will be evident that the arrangements shown in FIGS. 1 and 2 will also permit the turning of the guided parts 2 and 8 if these parts or members will be prevented from a lateral displacement or if only the intermediate member 5 or only the intermediate members 11 and 12 are displaced laterally. When employing a milling machine with a cutter working at the end face thereof, it will thus be possible during the milling operation to vary the downward movement of the miller in a stepless manner until a post-cutting will not occur any longer. Furthermore, the working table of a machine tool may be inclined, or inclination caused by an error in the production or adjustment may be eliminated without varying the level or height location of the table.

Figure 3:
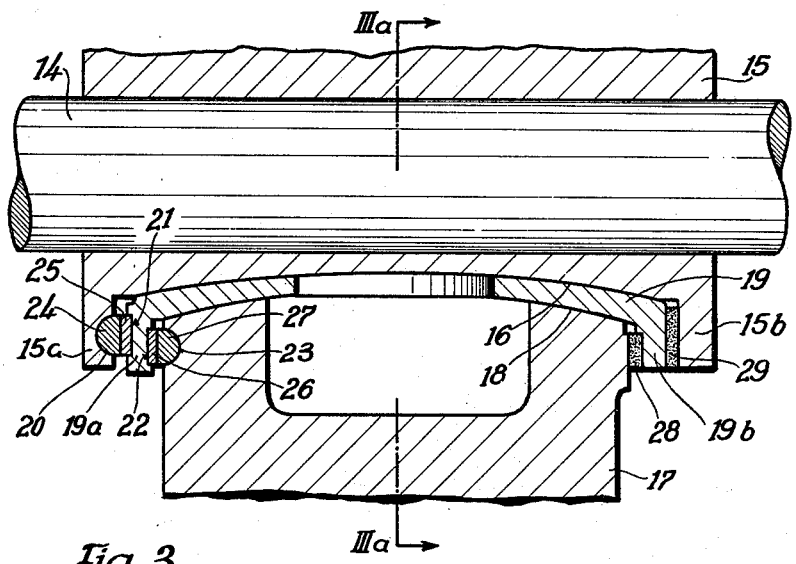
FIG. 3 is a section through the guiding arrangement of a grinding spindle.
Figures 3A, 3B:
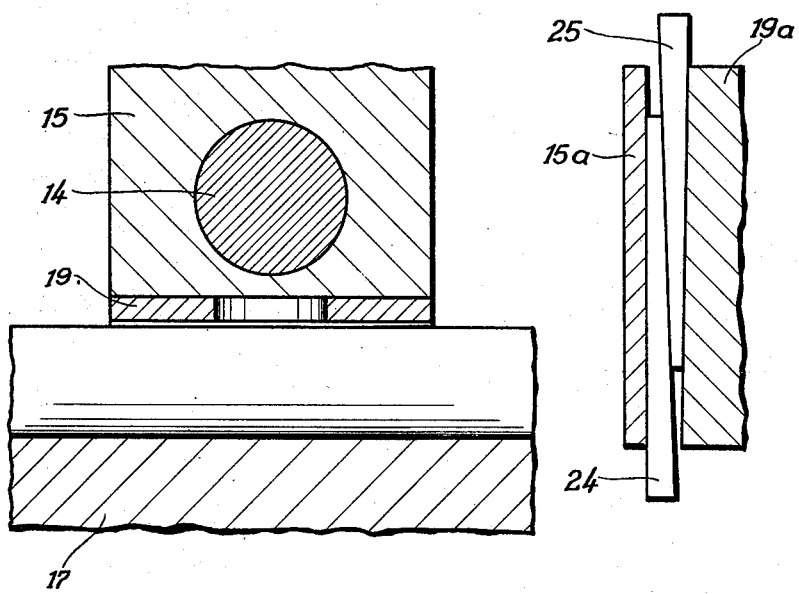
FIG. 3a is a vertical sectional view taken along line IIIa on FIG. 3.
FIGURE 3b is a fragmentary sectional view of a modification showing a pair of wedges similar to those illustrated in FIGURE 3.
Figure 3C:
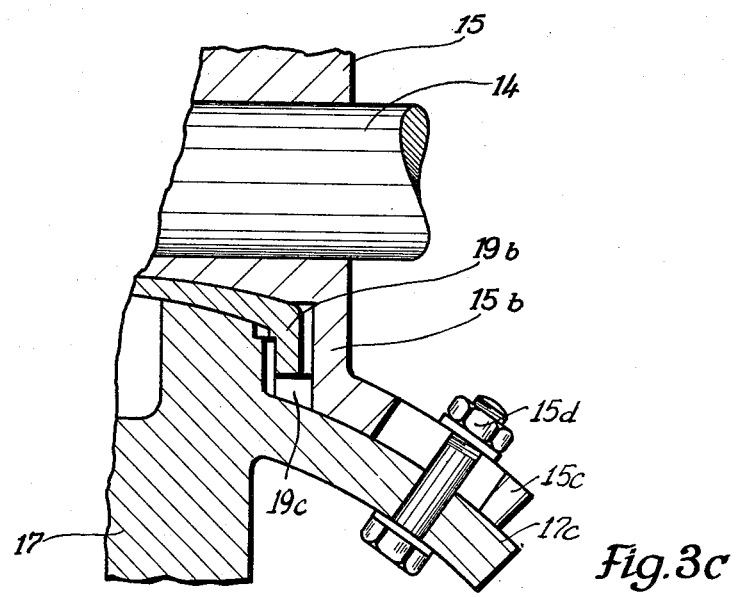
FIG. 3c is a fragmentary sectional view showing how the respective adjustable parts can be clamped in adjusted position.

FIG. 3 shows the shaft of a grinding disc which is journalled in the head stock 15 having one side thereof provided with a curved guiding surface 16. The stand or frame 17 is likewise provided with a curved guiding surface 18 the center of curvature of which does, however, not coincide with that of the surface 16. Between the head stock 15 and the stand 17 there is inserted an intermediate member 19 the contacting surfaces of which with parts 15 and 17 have the same curvature. The head stock 15 has its end faces provided with flange-like extensions 15a and 15b. Similar extensions 19a and 19b are also provided on the intermediate member 19. These extensions as well as the end faces of the stand 17 are provided with grooves 20, 21, 22 and 23 in which are inserted pairs of wedges 24, 25 and 26, 27 by means of which relative displacements between head stock 15 and intermediate member 19 and also between the latter and the stand 17 may be effected. These displacements may be effected by hand. Such displacements are made possible by elastic members 28, 29 between the oppositely located end face and extension 19b and also between the latter and the extension 15b. These members 28 and 29 may consist of any suitable elastic material as for instance rubber, synthetic material or the like, which will be able to absorb the pressure in the here occurring magnitude up to 5%. However, instead also other elastic elements as for instance a hydraulic cushion may be employed. If the occurring load should be too heavy to be carried by the elastic members 28, 29 alone, the stand 17 and the head stock 15 may be provided with additional flanges which, after adjustment of head stock 15, are rigidly fixed to one another by means of bolts (one being shown in FIG. 3c). Thus, with reference to FIG. 3c, the extensions 15b and 19b are each provided with a tongue or flange 15c and 19c respectively, which are adapted, by means of bolts 15d (one only being shown)

to be connected to two corresponding counter tongues or flanges 17c of the stand 17.

Figure 3D:
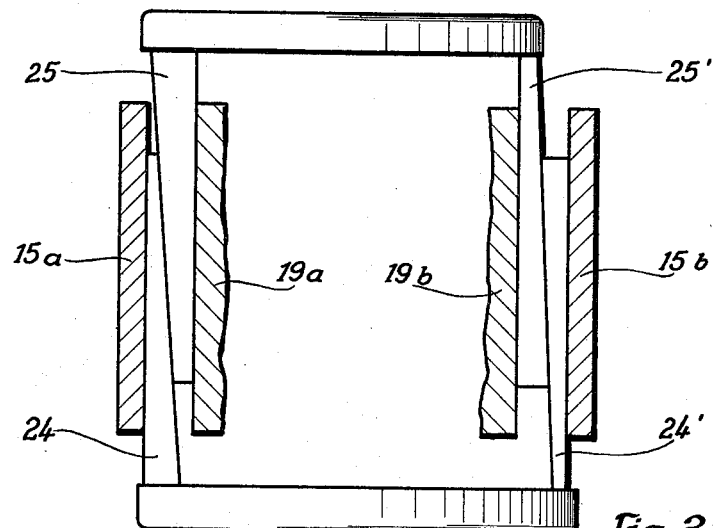
FIG. 3d is a view, partly in section, showing the employment of pairs of double wedges.

Instead of the elastic or rigid fixing means, also on the opposite side adjusting keys may be provided which are expediently connected or synchronized with the other keys. The arrangement of adjusting keys on both sides for instance with wide guiding beds makes possible the division of the intermediate member along the plane of symmetry thereof. Such an arrangement is shown in FIG. 3d, according to which the wedges 24 and 24' are rigidly coupled to each other, and also the wedges 25 and 25' are rigidly coupled to each other.

FIGS. 4 and 5 illustrate the journalling of a spindle of a milling machine with the head stock 30 having a bore 31 of square-shaped contour. Mounted in said bore 31 is a spindle 32 by means of a bearing sleeve 33, two pairs of intermediate members 34, 35 and 36, 37, and elastic counter holders 38 and 39. Between said holders 38 and 39 and the walls of the bore there are inserted locking members 40 and 41 by means of which in a manner known per se the bearing sleeve 33 may be clamped fast after a corresponding adjustment. Spindle 32 is by means of adjusting rings 42 secured in sleeve 33 against longitudinal displacements.

The journalling arrangement according to FIGS. 4 and 5 makes possible to turn and/or parallelly to displace the spindle 32 and, more specifically, alternatively within two planes perpendicular to each other. During a parallel displacement, the outer member of the non-adjusted pair of intermediate members serves as lateral guide. If, however, the spindle is to be turned for instance in the horizontal plane, the intermediate members 36, 37 and the locking member 41 are released so that no vertical clamping forces will prevail any longer. Now, the two intermediate members 34, 35 may be displaced until the spindle 32 has been moved into the desired inclined position. In this connection, it is, of course, understood that the bearing sleeve 33 will be secured against axial displacement, as shown in connection with sleeve 102 in FIG. 11.

In the illustrated embodiment, the outer surface of the guiding sleeve 33 is cylindrical with the spindle axis forming the axis of the cylinder. In order to be able in this way to obtain all possible variations similar to the arrangement of FIG. 2, the contacting surfaces 35a and 37a may be so curved that the axes of curvature will be perpendicular to the axis of the spindle while in the vertical and the horizontal plane there are provided three curved guiding paths each with different centers. Furthermore, in particular instances, the intermediate members 34, 36 may rest against separate plates 44 (indicated by dash lines) provided with pivots 43, and also the locking members 40 and 41 may be provided with pivots 45. In this way, a Cardan-like suspension will be obtained for the entire journalling of the spindle so that turning movements not only in one of two planes perpendicular to each other may be carried out but also in any desired planes.

The adjusting device for the intermediate members as shown in connection with the first embodiment, is to be considered merely as a diagrammatic showing. However, FIGS. 6 and 7 show in detail an adjusting device for minute displacements of the intermediate members in the turning direction which device will make it possible to effect displacements of a few thousandths of a millimeter in the direction of the feeding coordinate. In FIGS. 6 and 7, there are shown two curved intermediate members 50 and 51 having one end provided with rectangular passages 52, 53 engaged by eccentric discs 58, 59 while fitting members 54, 55, 56 and 57 are interposed. The discs 58, 59 are keyed to shaft 60. Depending on the desired adjusting possibilities, both eccentrics may be connected to an independent shaft while also two shaft sections are required which may be coupled together for certain requirements. In order to make impossible any play of movement, an elastic member 61 may be arranged between a fitting piece for instance 55 and the bore, or separate adjusting screws 62, 63 may be provided for adjusting the fitting members.

A particular advantage of this device is seen above all in that also during the operation of the tool, it will allow adjustments of the working table and of the tool. Thus, it is possible to couple shaft 60 or a half of the shaft to the table or tool feed in order, for instance, to produce flat curved surfaces. It is furthermore to be noted that instead of circular eccentric discs, cam shapes of any desired contour may be employed. Thus, it is possible mechanically by means of a grinding disc or a milling tool to produce irregular surfaces which heretofore had to be shaved by hand, so that considerable labor costs will be saved. When a grinding operation is involved, the surfaces and tools may even be hardened surfaces and/or tools.

The present invention is particularly applicable to heavy machine tools the guiding stand or guiding bed of which has a bulky shape and therefore can only at considerable expenses be provided with curved guiding surfaces. These difficulties can be overcome when the guiding surfaces proper are produced individually as separate parts and are then mounted on the plane machine parts to which they may for instance be connected by screws. This will be illustrated by FIG. 8 in connection with a working table 64 supported by a machine bed 65. The curved guiding surfaces are mounted on separate parts 66, 67 and 68, 69. These parts have one side thereof machined plane so that also the contacting surfaces of table 64 and bed 65 are to be shaped as plane surfaces while these planes expediently form angles $e_1$ and $e_2$ with each other. The magnitude of these angles is dependent on the radius of curvature. Between the parts 66, 68 and 67, 69 there are again provided intermediate members 70 and 71 which either like the parts coordinated therewith are designed so that they extend over the entire length of the bed, or they may be designed as a plurality of individual pieces which are connected to each other.

The manufacture of guiding members with curved guiding surfaces or guiding paths may be effected advantageously by slightly deforming these parts during their machining by mechanical or thermal stresses, i.e. by arching said parts in a concave or convex manner. FIG. 9 for instance illustrates a clamping device 72 with clamping jaws 73, 74 which firmly hold the guiding member 68 at both sides thereof. The bearing area of this device is provided with deep mutually heat insulated grooves 75, 76 and 77 having electric heating coils inserted thereinto. If the grinding disc 78 has to grind a convex surface, the heating coils 75 and 76 are energized. The outer portions of the guiding member 68 will, in this way, be heated up to a greater extent and will expand more than the intermediate portion. Consequently, the grinding disc 78 will at the marginal portion of the intermediate member 68 grind off more than in the central portion. When the ground article cools off, the expansions will again subside, and the surface originally ground plane will then obtain a slightly convex arch.

For purposes of producing concave arches, the intermediate heating spiral alone will be energized. Also in this instance, a process analogous to that described above will occur.

With the embodiments illustrated in FIGS. 10 to 16, the generatrices of the sliding surfaces of the wedge-shaped bodies are represented by circular arcs, or spherically designed wedge members are provided.

In the arrangement of FIGS. 10 and 11, there is provided a hollow shaft 101 which is journalled in the friction bearing bushing 102. This bushing has four diametrically oppositely located portions provided with convex arched surfaces 103 and concavely arched surfaces 103' the generatrices of which are circular arcs located in planes parallel to the bearing axis. It is on these surfaces that the circular wedges 104 and 104' are resting, the inner surface of said wedges 104 and 104' corresponding to the curvature of the surfaces 103, 103'. The outer surface 105 of wedge 104 is likewise convex when looking in the direction of displacement, and the surface 105' of wedge 104' is curved in a concave manner. The circular arches producing the said surfaces 105, 105' may have the same curvatures as the surfaces 103, 103' or may differ therefrom. However, they must not be concentric thereto. The wedges 106, 106' with geometrically identical inner surfaces rest on the wedge surfaces 105, 105'. For dimensioning the outer wedge surfaces 107, 107' of wedges 106, 106' by means of which surfaces said wedges rest against geometrically identical inner surfaces in the bearing housing 108, the same applies as has been described above with regard to the wedge surfaces 105, 105'. Each two wedges 104, 106, or 104', 106' are guided in a wide groove 109 and 109' the bottom surfaces of which form the counter surfaces of the outer wedge surfaces 107, 107'. In this way, each two wedges 104, 106 and 104', 106' are secured against lateral displacements. The housing 108 has an outer smooth cylindrical surface and has its ends closed by flanged lids 110, 111 screwed to the end faces of the housing.

For purposes of securing the bearing bushing 102 against axial displacements, elastic rings 112, 113 are arranged between the flanged lids 110, 111 and bushing 102. If heavy bearings are involved, instead of elastic rings 112, 113, also ball-shaped surfaces or curved surfaces at the interengaging ends of the bearing bushing and the extensions of the flanged lids may be provided.

For adjusting the arched wedges 104, 106 and 104', 106', any other suitable adjusting means may be employed as for instance threaded rotatable rings, adjusting screws, lever mechanisms, hydraulic pistons, and the like. Inasmuch as such means are generally known, FIG. 11 shows by way of example only merely adjusting screws 114, and 115 and play compensating springs 116, 117. All screw heads are expediently arranged in recesses, for instance countersunk openings 118 of the housing or of the flanged lid so that the bearing may in form of a complete plug element be inserted into a bore which, with regard to its coordinate location or alignment with other corresponding bores, does not require too small tolerances. With the illustrated cylindrical outer surface of the bearing housing, the latter may be turned at random in a wall bore receiving said housing and may then be arrested.

The operation of the wedge pairs 104, 106 during their displacement in common or individually, and, more specifically, in either opposite direction or in the same direction will be evident from the description of FIGS. 1 and 2. From said description it will be obvious that when both wedges, for instance wedge 104 and 106 of a pair of wedges, move in the same direction, a turning will occur, whereas when the two wedges of a pair move in opposite direction while maintaining a certain ratio between the displacement strokes, a parallel displacement of the shaft axis will occur. It is, of course, to be understood that for purpose of effecting a turning movement, those wedges which are offset to each other by 90°, will have to be released. For the multiple journalling by means of arched wedges, the following fundamental systems will serve:

I. The journalling with "dependent" circular arc wedges as they have been illustrated in FIG. 12 and according to which the vertices $S_0$ and centers $M_1$, $M_2$ of curvature in the starting position are located in the center plane $x$—$x$ between the two end bearings and II. The journalling with "independent" circular arc wedges as illustrated for instance in FIG. 13, according to which the vertices $S'_0$ of the circular arc wedges, and the center points $M_3$, $M_4$ of curvature are located in the central plane $y$—$y$ of each bearing.

It has to be decided in each case which of these systems is to be preferred. The system II is suitable primarily for bearings with more than two bearing stations and for large distance between the bearings. The system I on the other hand is primarily favored for two-fold bearings and short distances between the bearings.

FIGS. 12 and 13 once more illustrate the coordination of the convex and concave wedge surfaces. The arcs producing the same are designated in FIG. 12 with $b_1$, $b_2$ and $b_{3'}$, $b_{4'}$, whereas in FIG. 13 they are designated with the letters $b_5$, $b_6$ and $b_7$, $b_8$. The radii of curvature pertaining thereto are $r_1$, $r_1+\Delta_2$, $r_3$, $r_3+\Delta_4$, $r_5$, $r_5+\Delta_6$, $r_7$, $r_7+\Delta_8$. The coordinated arcs $b_1$, $b_2$ are located concentrically with the distance $\Delta_2$. Similarly, the arcs $b_3$, $b_4$ are concentric with the distance $\Delta_4$. For the parallel displacement of the shaft axis there exists the condition that $b_3$ ($b_4$) has a center $M_2$ which is different from the center of the arc $b_1$ ($b_2$) or that the radius $r_3$ ($r_3+\Delta_4$) are different from $r_1$ ($r_1+\Delta_2$). The same applies to the radii $r_4$ and $r_7$, and $r_5+\Delta_6$, and $r_7+\Delta_8$.

The above explained adjusting directions by means of circular arched wedges, allow turning movements in only that many planes as coordinated circular arc wedge pairs are employed unless as mentioned in connection with FIGS. 10 and 11 the entire bearing body is turned. If now the wedge surfaces are designed as convex or concave ball surfaces, it will be possible by means of two oppositely located wedge pairs to effect turning movements in any planes. Such spherical wedges may be explained in principle in connection with FIGS. 14 and 15. As will be seen from these figures, on a ball surface 120 with convex curvature and with the radius of curvature $R_0$, there rests the spherical wedge 121 the inner surface 121a of which is concave with the radius $R_0$ while its outer surface 121b is convex with a radius $R_1$ being greater than $R_0$. The spherical wedge 122 rests on the outer surface 121b while the inner surface 122a of wedge 122 is concave with the corresponding radius $R_1$. From the above, it will be obvious that a part (not shown) and journalled on wedge 122 will in response to a displacement of wedges 121 and 122 be lowered in opposite direction. Furthermore, a lowering movement on the ball surfaces is possible in any planes.

As adjusting means there may serve a ring 124 guided along a collar 123 and provided with two diametrically oppositely located pairs of screws 125, 126 and 125', 126'. By turning the ring 124, the pairs of screws will move into the desired turning plane.

FIG. 16 illustrates the employment of spherical wedges for the adjustment of an anti-friction bearing 127 in which shaft 128 is journalled. The anti-friction bearing 127 is encased in shells 129, 130 the outer surfaces 129a, 130a of which are spherically convex. These surfaces are engaged by spherical wedges 131, 132, 133, 134 in a manner analogous to FIG. 14. Of these wedges, wedges 132 and 134 rest against the spherically concave inner surfaces 135a, 136a of the flanged lids 135 and 136 rotatably journalled on the housing wall 137. For purposes of displacing said wedges, threaded bolts 138 and 139, and 138', 139' are provided which are connected to the collars of wedges 131, 132, and 133, 134. It will thus be obvious that my means of the illustrated adjusting mechanism, not only the distance between the centers of the bearings but also the alignment of the bearings can be effected in a geometrically precise manner which fact is of particular importance for the life of anti-friction bearings.

It is, of course, to be understood that the present invention is, by no means, limited to the particular constructions shown in the drawings but also comprises any modifications within the scope of the appended claims.

What I claim is:

1. In an adjusting arrangement for fine adjustment of machine parts: a guiding member having a cylindrical guiding surface, a guided member arranged in spaced relationship to said guiding member and having a cylindrical guiding surface of different radius of curvature and different center of curvature than the guiding surface of said guiding member, at least one intermediate member interposed between said guiding and guided members and establishing a guiding connection between said guiding surfaces of said guiding and guided members, and means operatively connected to said guided member and said intermediate member and operable to displace said last mentioned two members relative to said guiding member for finely adjusting said guided member in a plane transverse to the axis of the cylinder of which the cylindrical guiding surface of said guiding member forms part.

2. In an adjusting arrangement for fine adjustment of machine parts: a guiding member having a cylindrical guiding surface with a first center of curvature, a guided member arranged in spaced relationship to said guiding member and having a cylindrical guiding surface of different radius of curvature and with a different second center of curvature than the guiding surface of said guiding member, a first intermediate member interposed between said guiding and said guided members and having an inner surface curved in conformity with an engaging said cylindrical guiding surface of said guiding member and having an outer cylindrical guiding surface spaced from said guided member with a third center of curvature spaced from said second center of curvature by a distance equalling the distance between said first center of curvature and said third center of curvature, a second intermediate member interposed between said first intermediate member and said guided member and engaging said last mentioned two members along the respective adjacent guiding surfaces, said centers of curvature being disposed in a radial plane and means for moving said intermediate members perpendicular to said radial plane and relative to each other and to said guiding and guided members and for holding said intermediate members in adjusted positions.

3. In an adjusting arrangement for fine adjustment of machine parts: a guiding member having a first curved guiding surface with a first center of curvature, a guided member arranged in spaced relationship to said guiding member and having a second curved guiding surface differently curved from said first guiding surface and with a second center of curvature spaced from said first center of curvature, at least one intermediate member interposed between said guiding and said guided members and provided with spaced oppositely located curved surfaces at least one of which corresponds to one of said first and second guiding surfaces and is in sliding engagement therewith, said intermediate member being movable relative to said guiding member, said guided member and said intermediate member being provided with oppositely located flange-like extensions, and pairs of displaceable wedge members interposed between said flange-like extensions of said guided and said intermediate members.

4. An arrangement according to claim 3, in which the flange-like extensions are provided with overlapping tongues slidable on each other when said members are adjusted relatively and adapted to be clamped together to lock said members in adjusted position.

5. In an arrangement for the fine adjustment of a guided member relative to a guiding member, in combination; a guided member and a guiding member spaced therefrom, at least one adjustable intermediate element movably disposed between and in sliding engagement with said members, said intermediate element having a central plane of symmetry perpendicular to the direction of movability of said element, said element having curved first surfaces on the opposite faces thereof that engage complementary shaped second surfaces on the faces of said members that are adjacent the respective said first surfaces, the respective said first surfaces on said element each having a respectively different and constant radius of curvature, the centers of curvature of the said respective first surfaces being disposed in said plane of symmetry and spaced from each other in a direction radial to said first curved surfaces, and means connected to said guided member and said intermediate element for effecting movement thereof relative to each other and to said guiding member in a direction perpendicular to said plane of symmetry.

6. The combination according to claim 5 wherein said curved surfaces are cylindrical.

7. The combination according to claim 5 wherein said curved surfaces are spherical.

8. The combination according to claim 5 wherein said intermediate element comprises at least two interengaging portions movable relative to each other and with each of said portions engaging the respective one of said members, the region of interengagement of said portions comprising complementarily curved third surfaces thereon having a radius of curvature with a length intermediate the lengths of the radii of curvature of the said first curved surfaces and the center of curvature of said third curved surfaces being located on a line joining the centers of curvature of said first curved surfaces.

References Cited in the file of this patent
UNITED STATES PATENTS

| | | |
|---|---|---|
| 286,440 | Holt | Oct. 9, 1883 |
| 395,428 | Dobson | Jan. 1, 1889 |
| 1,565,264 | Dubi | Dec. 15, 1925 |